(12) United States Patent
Mabuchi et al.

(10) Patent No.: US 6,565,225 B2
(45) Date of Patent: May 20, 2003

(54) BAR-SHAPED LIGHT GUIDE, BEAM LIGHTING DEVICE USING THE BAR-SHAPED LIGHT GUIDE, AND SURFACE LIGHTING DEVICE USING THE BEAM LIGHTING DEVICE

(75) Inventors: Koji Mabuchi, Ogaki (JP); Youichiro Goto, Gifu (JP); Toru Nose, Ogaki (JP); Nobuo Iwatsuki, Gifu (JP)

(73) Assignee: Sanyo Electric Co., Ltd., Osaka-fu (JP)

( * ) Notice: Subject to any disclaimer, the term of this patent is extended or adjusted under 35 U.S.C. 154(b) by 76 days.

(21) Appl. No.: 09/906,846

(22) Filed: Jul. 18, 2001

(65) Prior Publication Data

US 2002/0008969 A1 Jan. 24, 2002

(30) Foreign Application Priority Data

Jul. 19, 2000 (JP) ........................................ 2000-219593

(51) Int. Cl.$^7$ ................................................ F21V 7/04
(52) U.S. Cl. .............................. 362/31; 362/26; 362/27; 385/146
(58) Field of Search .............................. 362/26, 27, 31, 362/555, 561, 582; 385/146

(56) References Cited

U.S. PATENT DOCUMENTS 5,506,929 A * 4/1996 Tai et al. ..................... 385/146
5,590,945 A * 1/1997 Simms ......................... 362/31
6,431,716 B1 * 8/2002 Kusakabe ..................... 362/31

FOREIGN PATENT DOCUMENTS

JP 2000-11723 A1 1/2000

* cited by examiner

Primary Examiner—Stephen Husar
(74) Attorney, Agent, or Firm—Arent Fox Kintner Plotkin & Kahn (57) ABSTRACT

This invention was made to reduce cost and the number of assembly processes and improve productivity by making viewing angle characteristics of light emitted from a light emitting surface even irrespective of a point in a bar-shaped light guide. A bar-shaped light guide of this invention comprises a light incident surface for receiving light emitted from a point light source, a light emitting surface, which is orthogonal to the light incident surface, for emitting light received on the light incident surface in a form of beam light, and a pattern surface made up of a side of the light incident surface and a side of the light emitting surface and having a plurality of grooves formed thereon. The plurality of grooves are regularly arranged on the pattern surface. An angle formed by the groove 106 and the side of the light emitting surface on a side of the point light source is 35–55°.

14 Claims, 9 Drawing Sheets

BAR-SHAPED LIGHT GUIDE, BEAM LIGHTING DEVICE USING THE BAR-SHAPED LIGHT GUIDE, AND SURFACE LIGHTING DEVICE USING THE BEAM LIGHTING DEVICE

BACKGROUND OF THE INVENTION

1. Field of the Invention

This invention relates to a bar-shaped light guide for converting light from a point light source into beam light, a beam lighting device using the bar-shaped light guide, and a surface lighting device using the beam lighting device.

2. Description of Prior Art

Figure 16:
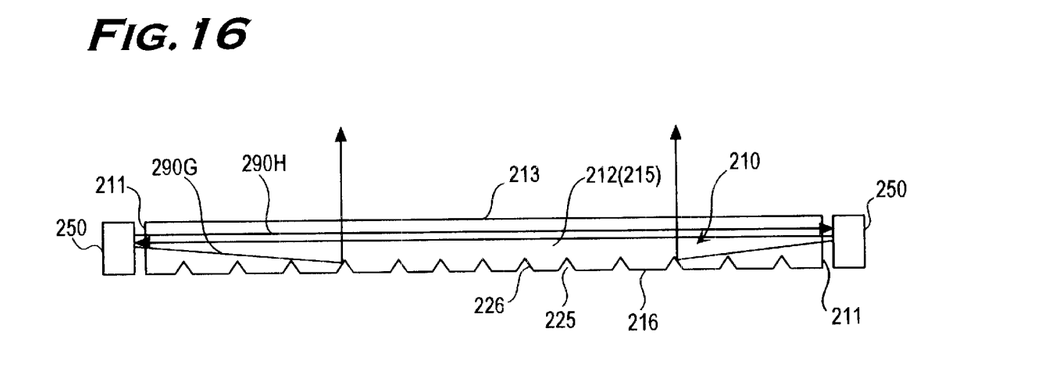
FIG. 16 is a schematic view illustrating a conventional bar-shaped light guide.

A beam lighting device, as shown in FIG. 16, for converting light emitted from a point light source such as a light emitting diode (LED) into beam light by a light guide is known. This beam lighting device includes point light sources 250, 250 on both end surfaces 211, 211 of a bar-shaped light guide 210, and a plurality of V-shaped grooves 225 are formed along a longitudinal direction of the bar-shaped light guide 210 on a reflecting surface 216 opposite to a light emitting surface 213. The light emitting surface 213 is a side surface of the light guide 210 in a longitudinal direction. The bar-shaped light guide 210 is a right prism comprising the light emitting surface 213, the reflecting surface 216, and side surfaces 212, 215 orthogonal to the light emitting surface 204 and the reflecting surface 216. With this structure, a part of light beam 290G incident from the point light source 250 into the bar-shaped light guide 210 reaches at an inclining surface 226 of the V-shaped groove 225 formed on the reflecting surface 216 and is reflected on the inclining surface 226. The reflected light reaches at the light emitting surface 213 at an angle smaller than a critical angle of the light emitting surface 213 and is emitted from the light emitting surface 213. The rest of the light beam incident into the bar-shaped light guide 210 reflects repeatedly within the light-emitting surface 213 and the reflecting surface 216 until the light reaches at the light emitting surface 213 at an angle smaller than the critical angle. On this principle, light emitted from the light emitting surface 213 can be distributed approximately evenly by adjusting a pitch and depths of the V-shaped grooves 225, resulting in achieving a beam light source.

As a beam light source of a lighting device for a liquid crystal display, JP 2000-11723, A discloses a surface lighting device, which uses a light source comprising a point light source and a bar-shaped light guide.

A light source described in this publication is a point light source arranged in a periphery of an end part of a light guide having light path converting means. The light path converting means includes grooves having a triangle shape in cross section, and a flat part formed between the grooves. The publication describes one example of the light path converting means, which a pitch between the grooves are uniform and a depth of the groove gradually increases as a distance from the point light source to the groove increases, and further describes another example of the light path converting means, which the depth of the grooves is uniform and a pitch between the grooves decreases as the distance from the point light source to the flat part increases.

The surface lighting device described in the publication uses two point light sources, arranged on both end parts of the bar-shaped light guide, and the point light sources are respectively arranged on a side end surface of a transparent substrate and face to the light guide.

In conjunction with this, the above structure, particularly as shown in FIG. 16, the bar-shaped light guide 210 has a rectangular shape in cross section with a uniform thickness. Therefore, the reflecting surface 216 is parallel to an optical axis of the light from the point light source 250, and lot of the light incident from the incident surface 211 does not irradiate the reflecting surface 216. As a result, light 290H which is perpendicular to the light incident surface 211 and is incident to a point higher than the depth of the V-shaped groove 225 can not reach at the reflecting surface 216, resulting in reduced light utilization efficiency of the incident light.

On the other hand, light, which enters the incident surface 211 in slant, reflects repeatedly between the light emitting surface 213, the reflecting surface 216, and both of the side surfaces. Then, the light reaches at the inclining surface 226 on the light source side of the V-shaped groove 225 formed on the reflecting surface 216, is reflected on the inclining surface 226, reaches at the light emitting surface 213, and is emitted from the light-emitting surface 213 with an angle smaller than a critical angle of the light-emitting surface 213.

Figure 17:
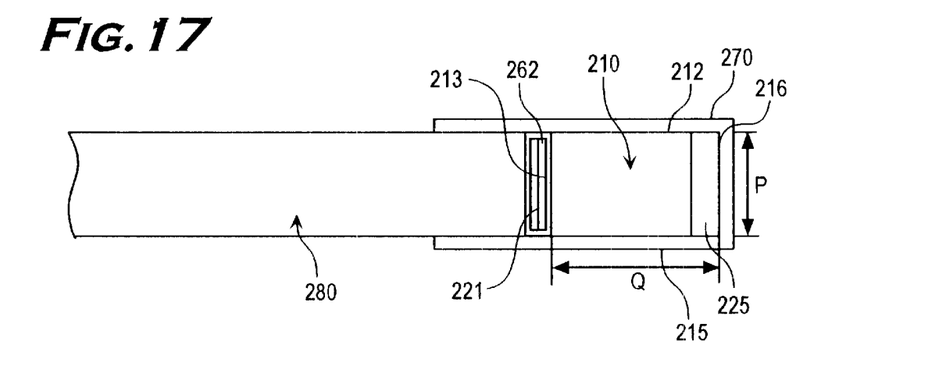
FIG. 17 is a schematic view illustrating a conventional surface lighting device in cross section taken along a centerline.

FIG. 17 illustrates a surface lighting device using the beam lighting device shown in FIG. 16. The light emitting surface 213 of the light guide 210 of the beam light source is positioned in a periphery of a side end surface of the light guide plate 280. The light guide 210 is held on a side end surface of the light guide plate 280 by a reflector 270 having a reflection function.

As shown in FIGS. 16 and 17, however, when the height P of the light emitting surface 213 in cross-section of the bar-shaped light guide 210 is longer than the width Q of side surfaces 212 and 215, an area occupied by the V-shaped grooves 225 of the bar-shaped light guide 210 in cross section is reduced. Therefore, the light, which repeats reflection between the light-emitting surface 213, the reflecting surface 216, and the side surfaces 212 and 215, does not reach at the inclining surface 226 on the light source side of the V-shaped groove 225 formed on the reflecting surface 216 (see FIG. 16), and the ratio of light reaching at the inclining surface 226 to all the light becomes low. Thus, the number of light beams which do not reach to the reflecting surface 216 but pass through the surface opposite to the light incident surface 211 increases, resulting in further reduction of utilization efficiency of the incident light.

Figure 18:
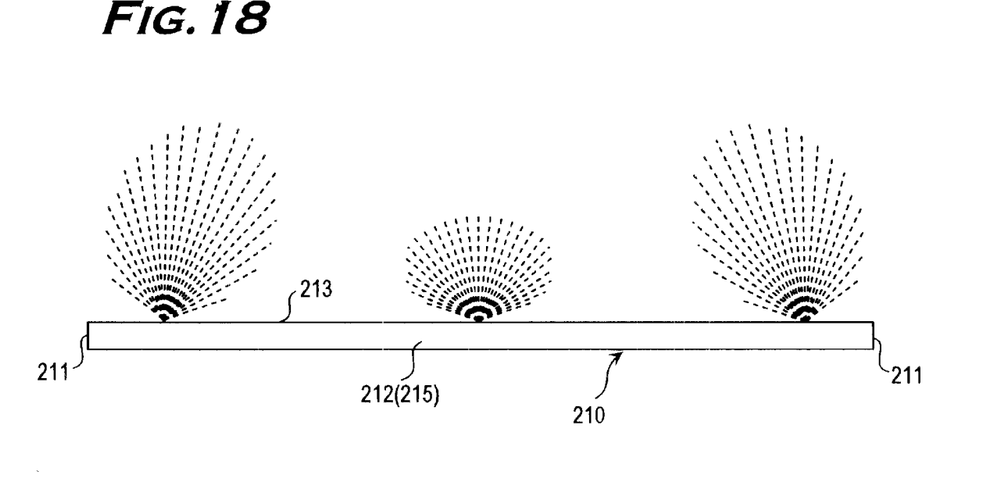
FIG. 18 is a schematic view illustrating an angle distribution of light emitted from the conventional bar-shaped light guide.

An incident angle of light which is directly incident to the inclining surface 226 on the light source side of the V-shaped groove 225 in the periphery of the incident surface 211 at which the light intensity is high, and an incident angle of light which is incident to the inclining surface 226 of the V-shaped groove 225 far from the light incident surface 211 are different. Therefore, as shown in FIG. 18, viewing angle characteristics of light emitted from the light emitting surface 213 varies depending on places. FIG. 18 illustrates angle distribution of light emitted from the bar-shaped light guide 210 at three points; in a periphery of the light incident surface 211 on a left side, at the center, and in a periphery of the light incident surface 211 on a right side. Needless to say, the angle distribution of the emitted light can be observed at any places.

To use such the beam light source as a light source for a light guide plate, for example, a diffusing sheet 261 and a lens sheet 262 should be arranged on the side of the light-emitting surface 213 for correcting light, resulting in degraded productivity caused by an increase in cost and the number of assemble processes.

SUMMARY OF THE INVENTION

This invention was made to improve utilization efficiency of an incident light.

Also it is an objective of the present invention to uniform viewing angle characteristics of light emitted from a light emitting surface at any spots of a bar-shaped light guide and to reduce costs and the number of assembly processes so as to improve the productivity.

A bar-shaped light guide of this invention comprises a light incident surface for receiving light emitted from a point light source, a light emitting surface, which is orthogonal to the light incident surface, for emitting the light received on the light incident surface in a form of beam light, a pattern surface made up of a side of the light incident surface and a side of the light emitting surface and including a plurality of grooves formed thereon. The plurality of the grooves are regularly arranged on the pattern surface, and an angle formed by the groove and the side of the light emitting source is 35–55° on a side of the point light source.

With this structure, main component of light emitted from the point light source is reflected on the grooves and the light is emitted from the light emitting surface in an approximately vertical line direction. Therefore, utilization efficiency of incident light can be improved. Furthermore, viewing angle characteristics of the light emitted from the light emitting surface can be uniform at any spots of the bar-shaped light guide.

A bar-shaped light guide of this invention comprises a first light incident surface for receiving light emitted from a first point light source, a second light incident surface, which is opposite to the first light incident surface, for receiving light emitted from a second point light source, a light emitting surface, which is orthogonal to a plurality of the light incident surfaces, for emitting light received on the plurality of the light incident surfaces in a form of beam light. The bar-shaped light guide further includes a first pattern surface made up of upper sides of the plurality of the light incident surfaces and an upper side of the light emitting surface and including a plurality of grooves regularly formed, where an angle formed by the upper side of the light emitting surface and the groove is 35–55° on a side of the first point light source, and a second pattern surface opposite to the first pattern surface and including a plurality of grooves regularly formed, where an angle formed by a bottom side of the light emitting surface and the groove is 35–55° on a side of the second point light source.

With this structure, light of high intensity can be emitted from the light emitting surface.

A bar-shaped light guide of this invention comprises a light incident surface for receiving light emitted from a point light source, and a light emitting surface, which is orthogonal to the light incident surface, for emitting light received on the light incident surface in a form of beam light. The bar-shaped light guide further includes a first pattern surface made up of an upper side of the light incident surface and an upper side of the light emitting surface and including a plurality of grooves regularly formed thereon, where an angle formed by the upper side of the light emitting surface and the groove is 35–55° on a side of the point light source, and a second pattern surface, which is opposite to the first pattern surface, including a plurality of grooves regularly formed thereon, where an angle formed by the bottom side of the light emitting surface and the groove is 35–55° on a side of the point light source.

With this structure, utilization efficiency of incident light can be further improved.

In any of the above described bar-shaped light guide, the plurality of the grooves formed on the pattern surface are formed with such a pitch that the grooves adjacent each other are partially overlapped at least in a longitudinal direction.

With this structure, utilization efficiency of incident light can be further improved.

Any of the above described bar-shaped light guide further comprises a surface opposite to the light emitting surface including a plurality of grooves regularly formed thereon.

With this structure, utilization efficiency of incident light can be completely improved A beam lighting device of this invention comprises any of the above describe bar-shaped light guide and a point light source arranged in a periphery of the light incident surface of the bar-shaped light guide.

The beam lighting device of this structure no longer needs a diffusion sheet and a lens sheet. Consequently cost and the number of assembly process can be reduced and productivity of the beam lighting device can be improved.

A surface lighting device of this invention includes a surface light guide plate arranged on the light emitting surface of the beam lighting device. The surface light guide plate includes a light incident surface for receiving light emitted from a light emitting surface of the beam lighting device, a reflecting surface, which crosses to the light incident surface at 80–100°, for reflecting light received on the light incident surface, and a light emitting surface, which is opposite to the reflecting surface, for emitting light reflected on the reflecting surface in a form of surface light.

The surface lighting device of this structure can improve productivity of the surface lighting device.

The foregoing and other objects, features, aspects and advantages of the present invention will become more apparent from the following detailed description of the present invention when reviewed in conjunction with the accompanying drawings.

DESCRIPTION OF PREFERRED EMBODIMENTS

Figure 1:
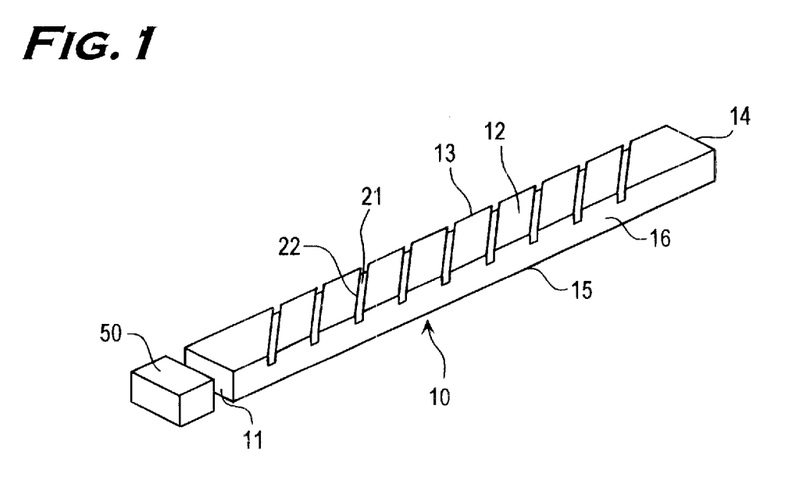
FIG. 1 is a perspective view illustrating an arrangement of a bar-shaped light guide and a light source according to a first embodiment of this invention.
Figure 2:
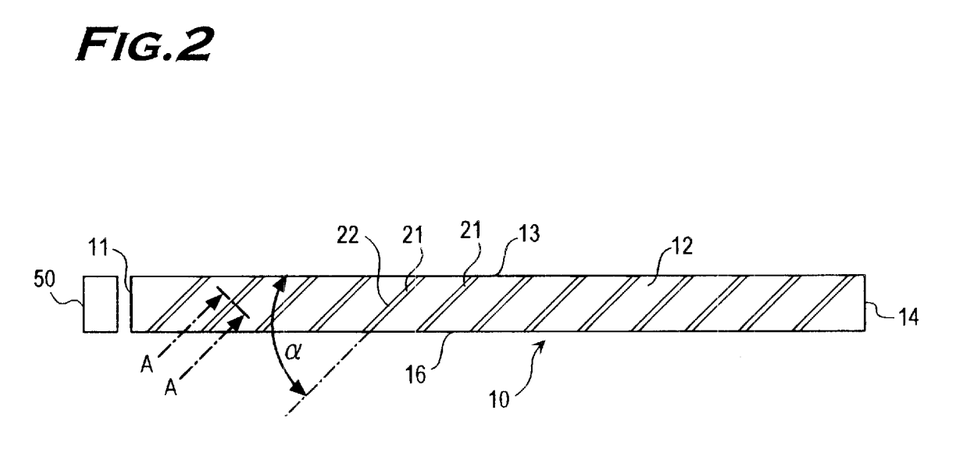
FIG. 2 is a top view illustrating the arrangement of the bar-shaped light guide and the light source of the first embodiment of this invention.

Explanation on the first embodiment of this invention is made by referring to FIGS. 1–4. FIG. 1 is a perspective view illustrating an arrangement of a bar-shaped light guide and a light source. FIG. 2 is a top view illustrating the arrangement of the bar-shaped light guide and the light source.

The bar-shaped light guide 10 has a right prism shape having following six faces; a light incident surface 11, a pattern surface 12, a light-emitting surface 13, an opposite surface 14 to the light incident surface 11, an opposite surface 15 to the pattern surface 12, and an opposite surface 16 to the light-emitting surface 13. The bar-shaped light guide 10, for example, is 60.1 mm in length, 2.8 mm in width (a length between the surface 13 and the surface 16), and 1 mm in height (a length between the surface 12 and the surface 15).

A distance between the pattern surface 12 and the opposite surface 15 to the pattern surface 12 (i.e. the height of the bar-shaped light guide) is shorter than a width of the pattern surface 12 (i.e. the width of the bar-shaped light guide).

In a periphery of the light incident surface 11, which is an end surface of the bar-shaped light guide 10, for example, a point light source 50 such as LED chip is arranged.

The pattern surface 12 having grooves 21 is formed in orthogonal to the light emitting surface 13 of the bar-shaped light guide 101 in a longitudinal direction. The pattern surface 12 is made up of a side of the light incident surface 11 and a side of the light emitting surface 13. A plurality of the grooves 21 are arranged regularly on the pattern surface 12.

The pattern surface 12, for example, has approximately one hundred and six grooves 21, which are 0.05 mm in width, 3.96 mm in length, 0.05 mm in depth and are arranged with a 0.5 mm pitch.

A plurality of the grooves 21 are formed in a longitudinal direction so that the side of the light emitting surface 13 and each of the grooves form an angle α on a side of the point light source.

The angle α formed by the groove 21 and the side of the light-emitting surface 13 is approximately 45° on the side of the point light source 50. Therefore, main component of light from the point light source 50, which is in parallel with the bar-shaped light guide 10 in a longitudinal direction, is reflected on a side surface 22 of the groove 21 on the light source side, and is emitted in an approximately vertical line direction to the light emitting surface 13.

The angle of approximately 45° means 35–50°, preferably means 40–50°, and further preferably 45°. An angle intended by "approximately orthogonal" and "approximately vertical" means 80–100°, preferably 85–95°, and further preferably 90°.

With this structure, incident light can be used effectively and viewing angle characteristics of light emitted from the light emitting surface can be even at any places of the bar-shaped light guide.

The grooves 21 are formed with such a pitch that the grooves adjacent each other are continuous in a longitudinal direction or a part of the grooves are overlapped. That is, the pitch of the grooves are determined so that an end part of the groove 21 of an upper side on a light emitting surface 13 side and an end part of the other groove 21 of a lower side on the surface 14 side are continuously formed or overlapped partially when viewing from a width direction of the bar-shaped light guide 10.

With this structure light, utilization efficiency of incident light can be further improved. When the overlapped area of the adjacent grooves 21 increases, the light passing through the surface opposite to the light incident surface 11 decreases to improve light utilization efficiency. However, when the overlapped area of the grooves 21 increases excessively, a pitch between the grooves is narrowed and workability is degraded.

FIGS. 3A–3D are the enlarged explanatory views illustrating variations of a groove in cross section taken along the A—A line of FIG. 2. These variations are applicable not only to the first embodiment but also to other embodiments.

Figure 3A:
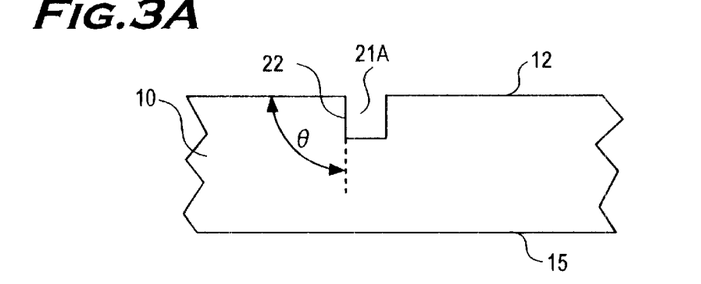
FIGS. 3A–3D are enlarged explanatory views illustrating variations of a groove in cross section taken along the A—A line of FIG. 2.

A shape of a groove 21A in cross section in FIG. 3A is rectangular. A side surface 22 on the light source side is approximately 90° to the pattern surface 12 of the bar-shaped light guide 10.

Figure 3B:
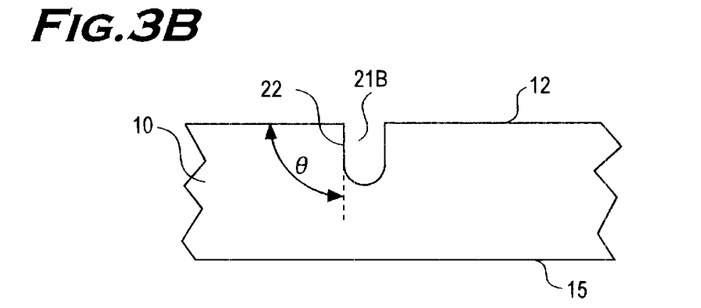

A shape of a groove 21B in cross section shown in FIG. 3B is a U-shape. A side surface 22 on the light source side includes a plane surface, which is approximately 90° to the pattern surface 12, and a curved surface being a semicircle in cross section.

Figure 3C:
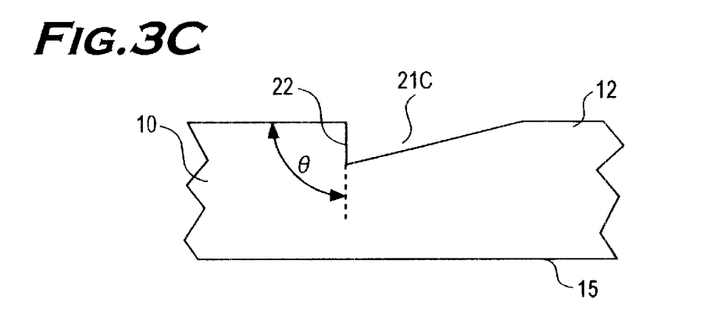

A shape of a groove 21C in cross section in FIG. 2C is a right triangle. A side surface 22 on the light source side is approximately 90° to the pattern surface 12 of the bar-shaped light guide 10.

Figure 3D:
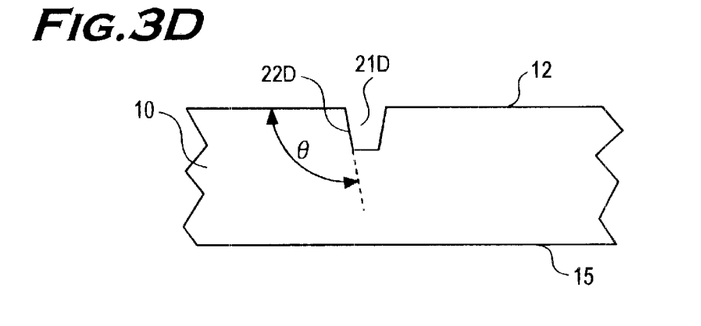

A shape of a groove 21D in cross section in FIG. 2D is an inverted trapezoid. A side surface 22D on the light source side is angled at an obtuse angle greater than 90° to the pattern surface 12 of the bar-shaped light guide 10. The shape of the inverted trapezoid enables to mold the bar-shaped light guide 10 easily.

As shown in FIGS. 3A–3C, an angle θ formed by the side surface on the light source side 22 and the pattern surface 12 of the grooves 10A–10C is preferably approximately 90° (80–100°). An angle 90°<θ≦95° is more preferable when considering molding with a die. The obtuse angle θ of FIG. 2D is preferably 95°<θ≦105° so that light reflected on the side surface 22D on the light source side is effectively emitted from the light emitting surface 13 (not shown).

Figure 4:
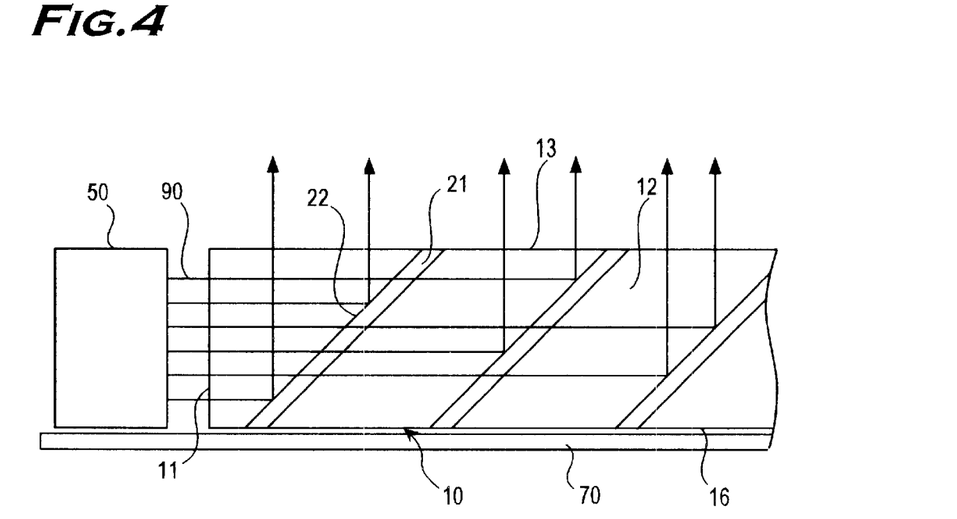
FIG. 4 is a schematic view illustrating an operation principle according to the first embodiment of this invention.

FIG. 4 is a schematic view illustrating an operation principle of the first embodiment of this invention. Detailed explanation on the first embodiment is made by referring to FIG. 4.

A light beam 90 emitted from the point light source 50 passes through the light incident surface 11 of the bar-shaped light guide 10, is reflected on the side surface 22 on the light source side inclined at approximately 45° to the light emitting surface 13 to change its direction by approximately 90°, and is emitted from the light emitting surface 13. Light reaching to the side surface 22 on the light source side directly from the point light source 50 is little, and much of the light is reflected repeatedly between flat parts of the pattern surface 12 and the surface opposite to the pattern surface 105 (for example the surface 15 in FIG. 1), and then reaches at the side surface 22 on the light source side of the groove 21.

Because the distance between the pattern surface 12 having the grooves 21 and the surface opposite to the pattern surface is smaller than the width of the pattern surface 12, the number of light beams entering the light incident surface 11 and passing through the surface opposite to the light incident surface 14 (not shown) without reflection is reduced, and thereby light utilization efficiency is improved.

Figure 15:
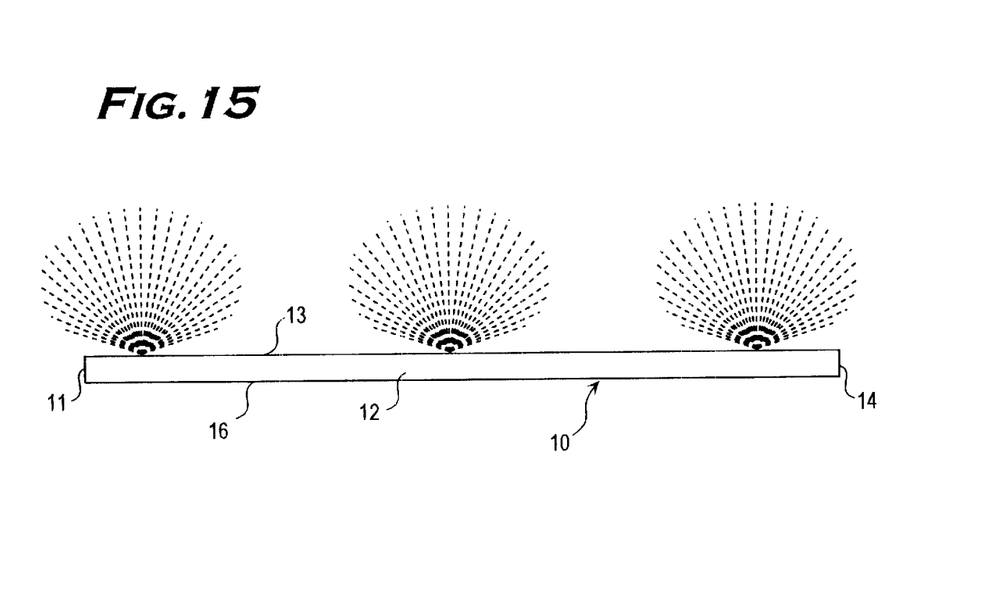
FIG. 15 is a schematic view illustrating an angle distribution of light emitted from the bar-shaped light guide.

FIG. 15 is a schematic view illustrating an angle distribution of light emitted from the bar-shaped light guide of this invention. FIG. 15 schematically illustrates an angle distribution of light emitted from the bar-shaped light guide 10 at three points; a periphery of the light incident surface 11, at a center, and a periphery of the surface opposite to the bar-shaped light guide 14. Needless to say, the angle distribution of emitted light exists at any points.

According to this invention, the angle distribution of the light emitted from the bar-shaped light guide 10 are approximately uniform at any points and approximately symmetric with respect to a vertical line direction of the light emitting surface 13.

Explanation on variations in means for controlling the light quantity distribution in the first embodiment of this invention is made by referring to FIGS. 9–12.

A pitch between the grooves 21 is uniform in the first embodiment.

Figure 9:
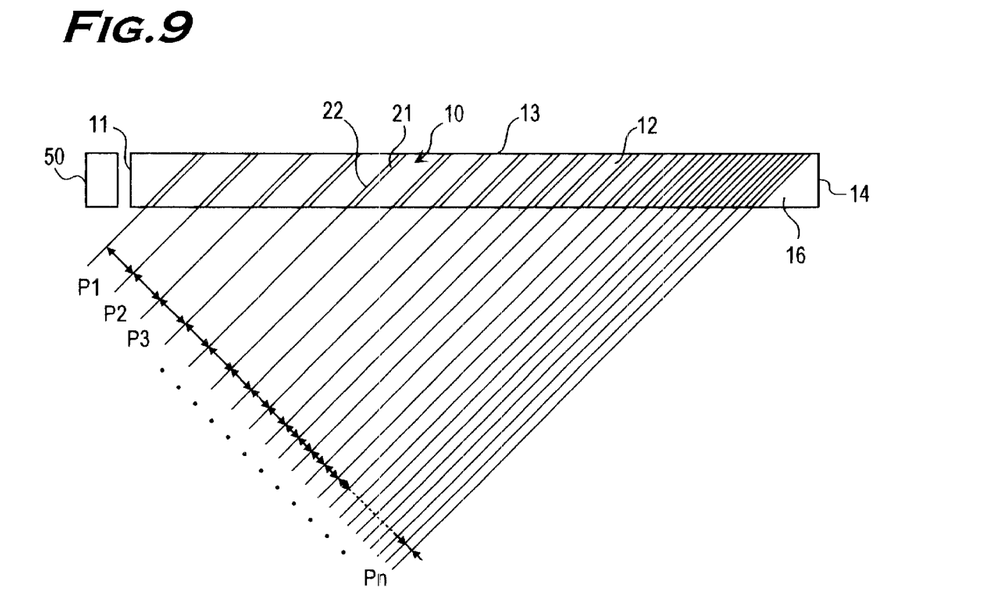
FIG. 9 illustrates a structure of a beam light guide which a pitch between grooves of the beam light guide reduces as a distance from a point light source to the grooves increases.

On the other hand, in a variation shown in FIG. 9, the pitch P between the grooves 21 of the beam light guide 10 becomes smaller, as indicated by P1, P2, P3 . . . Pn, as the grooves are farther from the point light source 50.

For example, the pitch P1 is 0.5 mm, P2 is 0.49 mm, P3 is 0.48 mm, and Pn is 0.14 mm. The number of the grooves (n) is 150 (106 or more).

Figure 10:
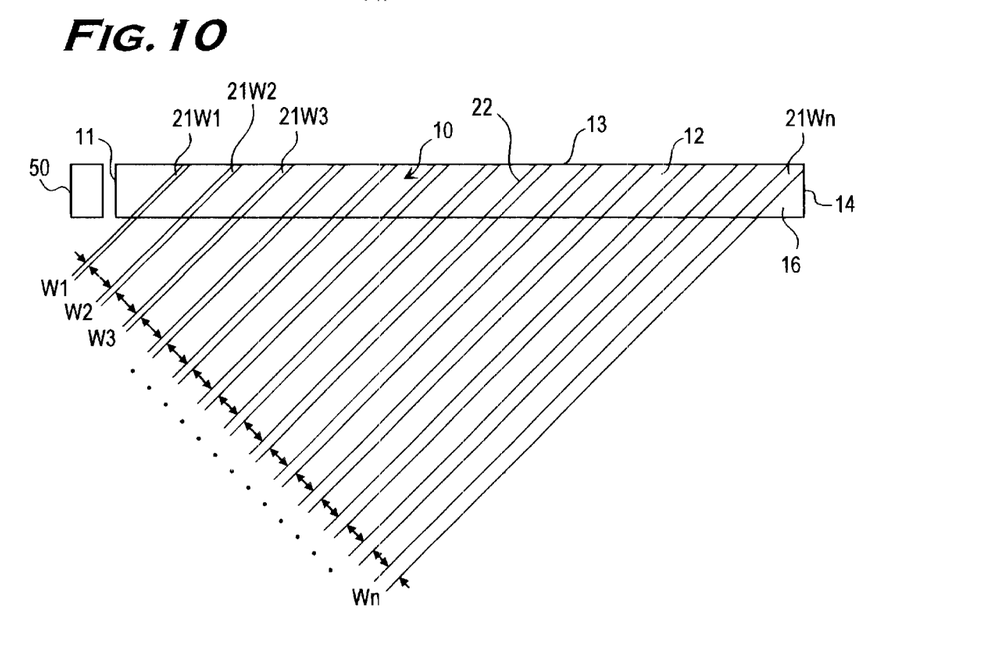
FIG. 10 illustrates a structure of the beam light guide which a width of the groove gradually increases as a distance from a point light source to the grooves increases.

In a variation shown in FIG. 10, a width W of the grooves 21 of the beam light guide 10 becomes larger, as indicated by W1, W2, W3 . . . Wn, as the grooves 21 are farther from the point light source 50. The grooves 21 become wider, as indicated by a groove 21W1, a groove 21W2, a groove 21W3 . . . a groove 21Wn, as the grooves are farther from the point light source 50.

For example, the groove 21W1 is 0.0140 mm in width, the groove 21W2 is 0.0142 mm, the groove 21W3 is 0.0144 mm and the groove 21Wn is 0.0500 mm. The number of the grooves (n) is about 106.

In this case, the groove 106 preferably has a V-shape in cross section.

Figure 11:
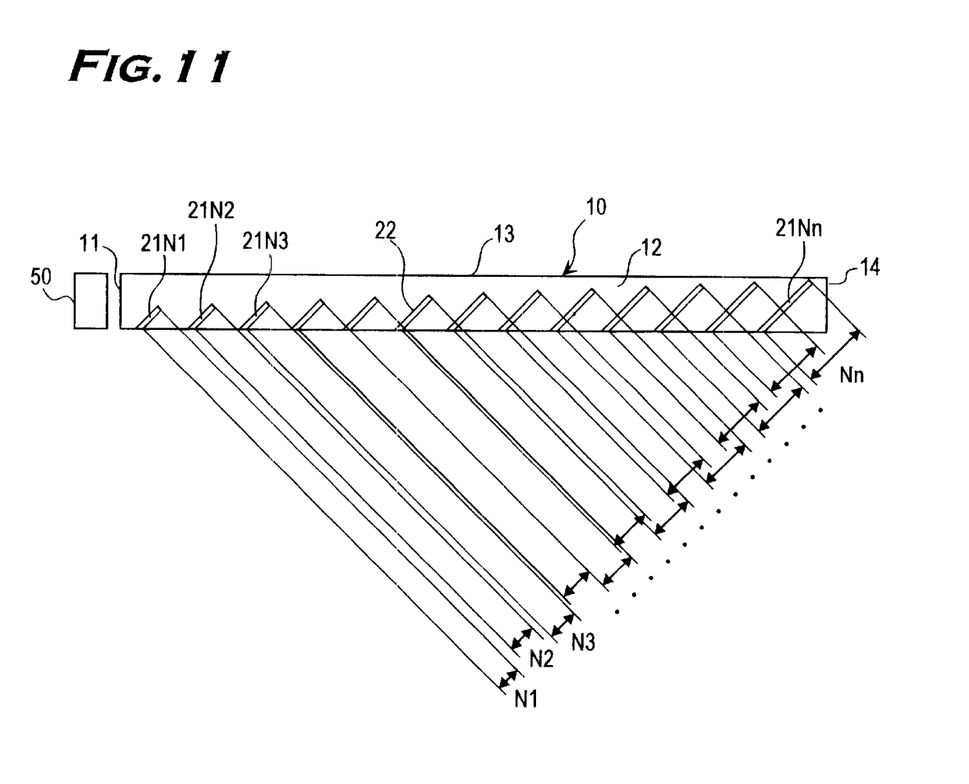
FIG. 11 illustrates a structure of the beam light guide which a length of the groove gradually increases as a distance from a point light source to the grooves increases.

In a variation shown in FIG. 11, lengths N of the grooves 21 of the beam light guide 10 increase, as indicated by N1, N2, N3 . . . Nn, as the grooves 21 are farther from the point light source 50. The grooves 21 become longer, as indicated by a groove 21N1, a groove 21N2, a groove 21N3 . . . a groove 21Nn, as the grooves are farther from the point light source 50.

For example, the groove 21N1 is 1.109 mm in length, the groove 21N2 is 1.125 mm, the groove 21N3 is 1.140 mm, and the groove 21Nn is 3.960 mm. The number of the grooves (n) is about 106.

Figure 12:
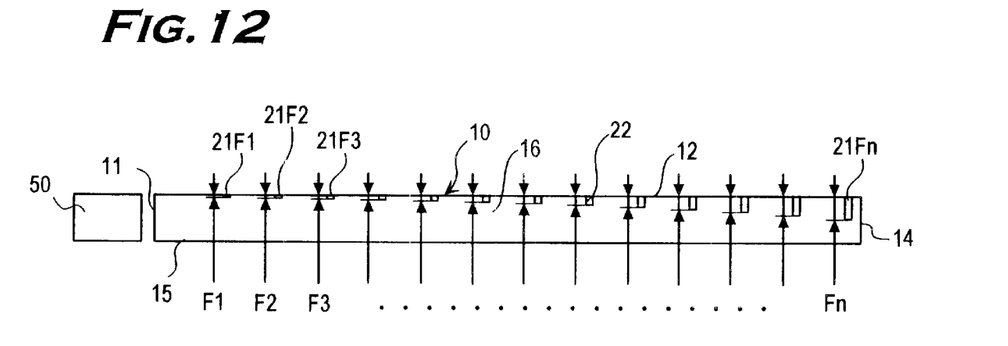
FIG. 12 illustrates a structure of the beam light guide which a depth of the groove increases as a distance from a point light source to the grooves increases.

In a variation shown in FIG. 12, depths F of the grooves 21 of the beam light guide 10 increase, as indicated by F1, F2, F3 . . . Fn, as the grooves 21 are farther from the point light source 50. The grooves 21 become deeper, as indicated by a groove 21F1, a groove 21F2, a groove 21F3 . . . a groove 21Fn, as the grooves are farther from the point light source 50.

For example, the groove 21F1 is 0.0140 mm in depth, the groove 21F2 is 0.0142 mm, the groove 21F3 is 0.0144 mm and the groove 21Fn is 0.050 mm. The number of the grooves (n) is about 106.

As above described, means for controlling a light quantity distribution includes; 1) changing a pitch between the grooves 21, 2) changing a width of the groove particularly when the groove has a V-shape in cross section, 3) changing a length of the groove, and 4) changing a depth of the groove. And a combination of them is also practicable.

Figure 5:
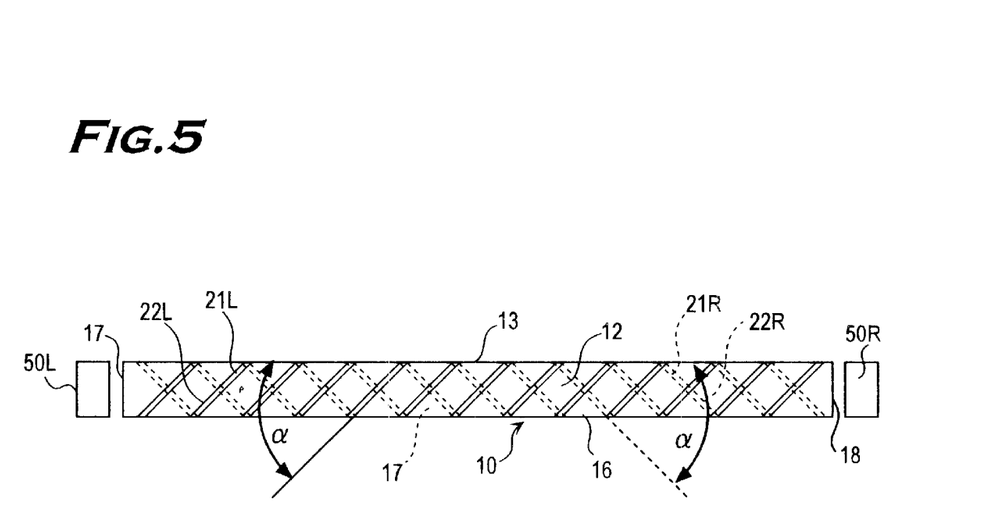
FIG. 5 is a top view illustrating a structure of a bar-shaped light guide including grooves formed on both surfaces of the bar-shaped light guide, and point light sources arranged on end surfaces on both sides of the bar-shaped light guide according to a second embodiment of this invention.
Figure 6:
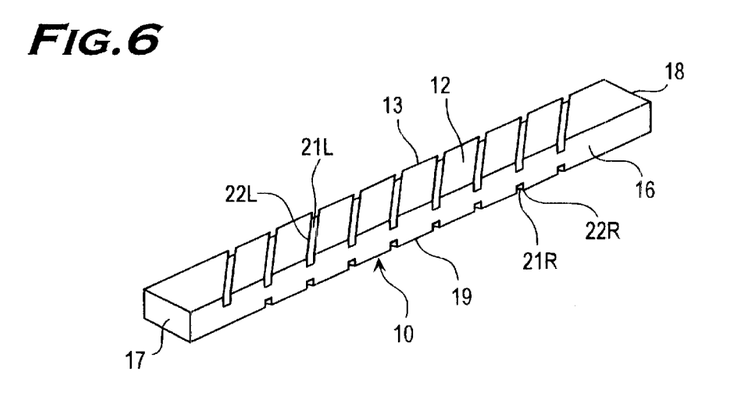
FIG. 6 is a perspective view illustrating the bar-shaped light guide according to a second embodiment of this invention.

Explanation of a second embodiment of this invention is made by referring to FIGS. 5–6.

FIG. 5 is a top view illustrating a structure of a bar-shaped light guide including grooves formed on both surfaces and point light sources arranged on end surface on both sides of the bar-shaped light guide.

FIG. 6 is a perspective view illustrating the bar-shaped light guide having grooves formed on both surfaces according to the second embodiment of the present invention.

The bar-shaped light guide 10 has six surfaces; a first end surface 17 functioning as a first light incident surface, a first pattern surface 12, a light emitting surface 13, a second end surface 18 functioning as a second light incident surface and opposite to the first end surface 17, a second pattern surface 19 opposite to the first pattern surface 12, and a surface 16 opposite to the light emitting surface 13.

A first point light source 50L is arranged in a periphery of the first end surface 17 on one side of the bar-shaped light guide 10. A second point light source 50R is arranged in a periphery of the second end surface 18 on the other side of the bar-shaped light guide 10.

The first pattern surface 12 is formed so as to be approximately orthogonal to the light emitting surface 13 of the bar-shaped light guide 10 in a longitudinal direction. The first pattern surface 12 is made up of an upper side of the first end surface 17 and an upper side of the light emitting surface 13. A plurality of first grooves 21L are arranged regularly on the first pattern surface 12. The plurality of the first grooves 21L are formed so that an angle formed by the upper side of the light emitting surface 13 and the first groove 21L is approximately 45° on the side of the first point light source 50L. The first groove 21L includes a side surface 22L on the first light source side, which reflects light emitted from the first light source 50L to the light emitting surface 13.

A plurality of second grooves 21R are formed on the second pattern surface 19 opposite to the first pattern surface 12 so that an angle formed by a bottom side of the light emitting surface 13 and the groove 21R is approximately 45° on a side of the second light source 50R. The second groove 21R includes a side surface 22R on the second light source side, which reflects light emitted from the second light source 50R to the light emitting surface 13.

As described above, the plurality of the grooves 21 are formed on both of the first pattern surface 12 and the second pattern surface 19. Inclination directions of the grooves on the first pattern surface 12 and the grooves on the second pattern surface 19 are preferably opposite so that light emitted from the point light sources 50 arranged at right and left sides of the bar-shaped light guide 10 is reflected to the light emitting surface 13.

With this structure, light of high intensity can be emitted from the light-emitting surface 13.

Figure 7:
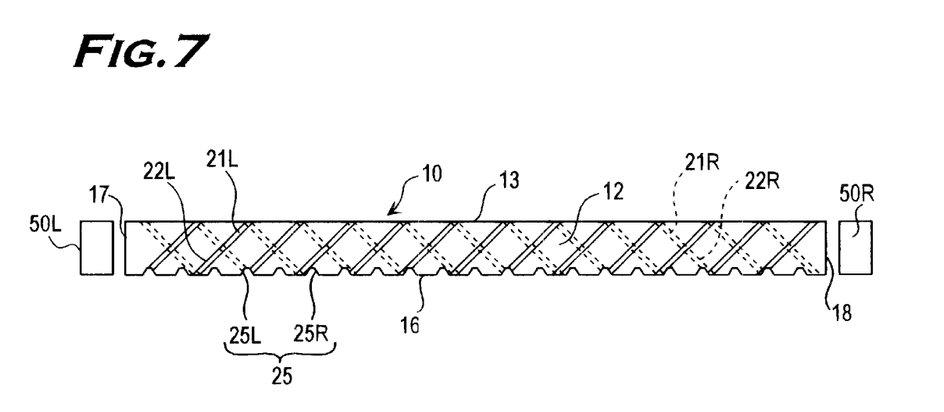
FIG. 7 illustrates a structure, as a third embodiment, of the bar-shaped light guide shown in FIG. 5 for the second embodiment, which includes a V-shaped groove formed on a surface opposite to a light emitting surface of the bar-shaped light guide.

Explanation on a third embodiment of this invention is made by referring to FIG. 7.

FIG. 7 illustrates a structure of the bar-shaped light guide shown in FIG. 5 for the second embodiment with V-shaped grooves formed on a surface opposite to a light emitting surface.

A plurality of V-shaped grooves 25 are formed on the surface opposite to the light emitting surface 13 of the bar-shaped light guide 10 along a longitudinal direction of the bar-shaped light guide 10. A V-shape of the groove is preferably formed by two sides forming a right angle of an isosceles triangle. The V-shaped groove 25 includes an inclining surface 25L on the first light source side and an inclining surface 25R on the second light source side. The inclining surface 25L on the first light source side reflects light emitted from the first point light source 50L to the light emitting light surface 13. The inclining surface 25R on the second light source side reflects light emitted from the second point light source 50R to the light emitting surface 13.

With this structure, utilization efficiency of incident light is completely improved.

Figure 8:
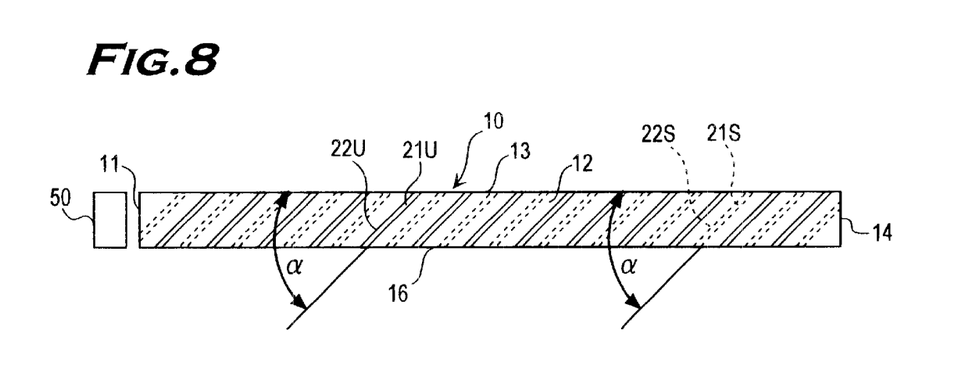
FIG. 8 illustrates a structure, as a fourth embodiment, of a bar-shaped light guide including a groove formed on both surfaces of the bar-shaped light guide, and a point light source arranged on an end surface on a side of the bar-shaped light guide.

Explanation of a fourth embodiment of this invention is made by referring to FIG. 8.

FIG. 8 illustrates a structure of the bar-shaped light guide of the first embodiment including grooves formed on both surfaces.

A plurality of third grooves 21U are formed on an upper pattern surface 12 of the bar-shaped light guide 10 so that an angle formed by an upper side of the light emitting surface 13 and the groove 21U is approximately 45° on the side of the point light source 50. The third groove 21U includes a third side surface 22U on the light source side, which reflects light emitted from the point light source 50 to the light emitting surface 13.

A plurality of fourth grooves 21S are formed on a lower pattern surface 19 opposite to the upper pattern surface 12 so that an angle formed by a bottom side of the light emitting surface 13 and the fourth groove 21S is approximately 45° on the side of the point light source 50. The fourth groove 21S includes a fourth side surface 22S on the light source side, which reflects light emitted from the point light source 50 to the light-emitting surface 13.

Inclination directions of the third grooves 21U and the fourth grooves 21S are preferably the same because light emitted from the point light source 50 is reflected on both of the third and fourth grooves and travels to the light-emitting surface 104.

Even when the point light source 50 is arranged on only one end surface 11 of the bar-shaped light guide 10, light can be used more efficiently by forming the grooves 21 on the upper pattern surface 12 and the lower pattern surface 19 approximately orthogonal to the light emitting surface 13 of the bar-shaped light guide 101 in a longitudinal direction.

Figure 13:
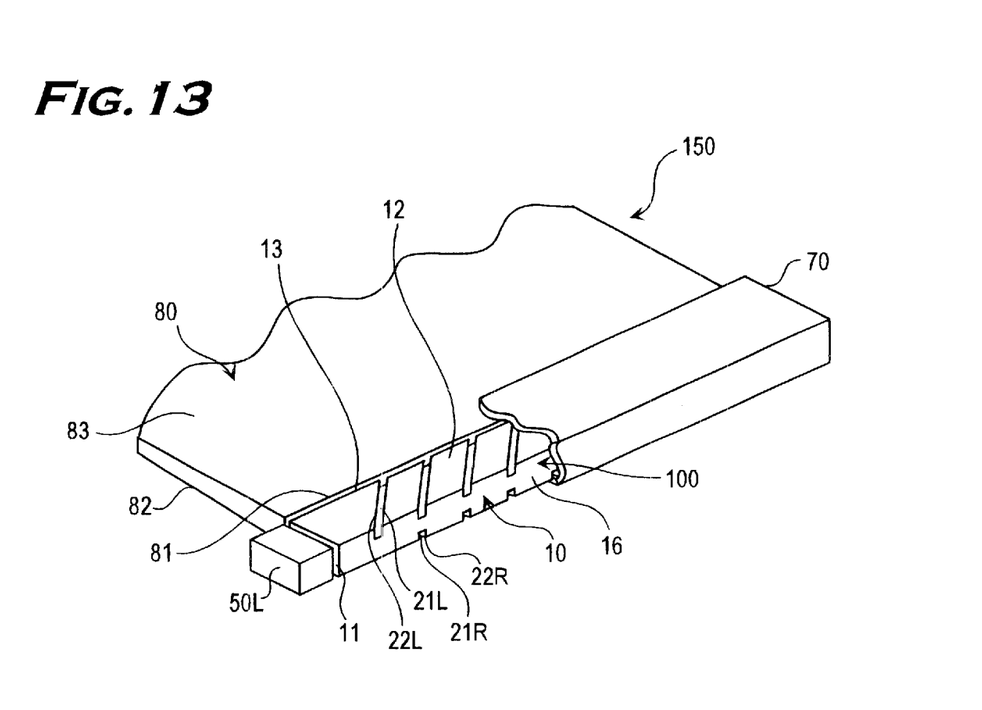
FIG. 13 illustrates a surface lighting device which uses the bar-shaped light guide, which includes the grooves formed on both surfaces as described in the second embodiment, as a backlight or a front light.
Figure 14:
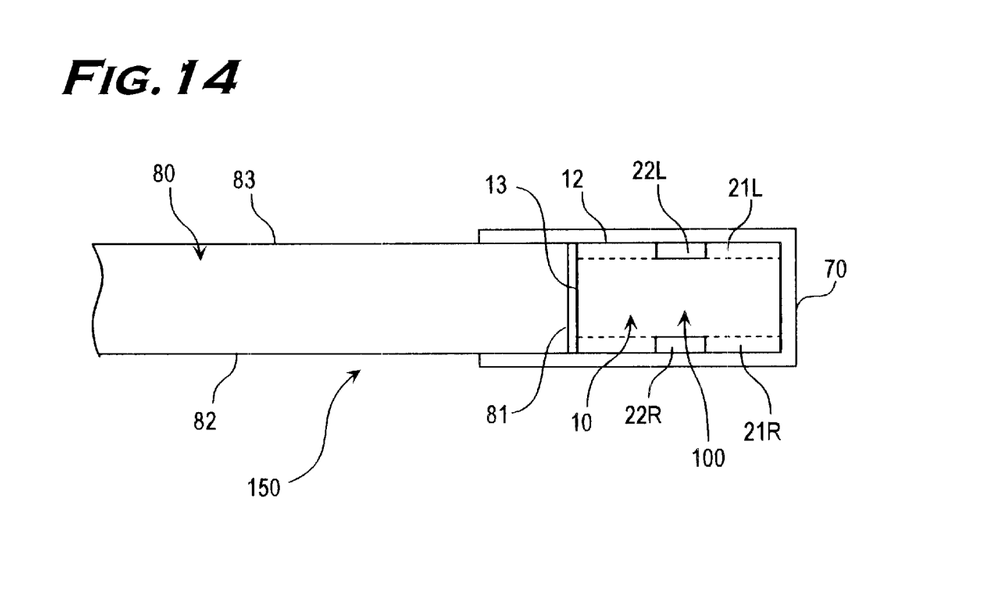
FIG. 14 is a cross sectional view taken along a centerline of the surface lighting device shown in FIG. 13.

Explanation of a surface lighting device using the beam lighting device according to the second embodiment of this invention is made by referring to FIGS. 13 and 14. Although the beam lighting device of the second embodiment is applied to the surface lighting device shown in FIGS. 13 and 14, the surface lighting device is also available in the other embodiment.

FIG. 13 illustrates a surface lighting device using the bar-shaped light guide, which includes grooves formed on both surfaces as described in the second embodiment, as the beam light source of a backlight or a front light.

FIG. 14 is a cross sectional view taken along a centerline of the surface lighting device shown in FIG. 13.

A beam lighting device 100 is a light source unit which functions as a beam light source and comprises a first point light source 50L, a second point light source 50R (not shown), a bar-shaped light guide 10 and a reflector 70 having a reflecting function.

The surface lighting device 150 as a surface light source comprises the beam lighting device 100 and a surface light guide plate 80 which converts beam light into surface light.

The surface light guide plate 80 is arranged so as to oppose to the light emitting surface 13 of the bar-shaped light guide 10 which is included in the beam lighting device 100 and is held by a reflector 70 of the beam lighting device 100. The surface light guide plate 80 includes a light incident surface 81 which light emitted from the light emitting surface 13 of the beam lighting device 100 enters, a reflecting surface 82 which is orthogonal to the light incident surface 81 and reflects light incident to the light incident surface 81, and a light emitting surface 83 which is opposite to the reflecting surface 82 and emits light reflected on the reflecting surface 82 and converts the emitted light into surface light.

Because FIG. 13 is illustrated from a side of the first point light source 50L, only the side surface 22L on the first light source side can be seen and the side surface 22R on the second light source side can not been seen.

This invention no longer needs a diffusion sheet and a lens sheet, and cost and the number of assembly processes are reduced. Thus, productivity of the beam lighting device is improved.

In the above embodiments, the drawings for helping understanding are illustrated schematically and a dimension and a reduced scale of some parts are not in accordance with the actual dimension.

Although the present invention has been described and illustrated in detail, it is clearly understood that the same is and example only and is not to be taken by way of limitation by way of illustration, the spirit and scope of the present invention being limited only by the terms of the appended claims.

What is claimed is:

1. A bar-shaped light guide comprising;
   a light incident surface for receiving light emitted from a point light source,
   a light emitting surface, which is orthogonal to the light incident surface, for emitting the light received on the light incident surface in a form of beam light,
   a pattern surface made up of a side of the light incident surface and a side of the light emitting surface, which are contact each other, and including a plurality of grooves formed thereon, a surface opposite to the light emitting surface, and a surface opposite to the pattern surface, wherein the plurality of the grooves are regularly arranged on the pattern surface and an angle formed by the groove and the side of the light emitting source is 35–55° on a side of the point light source.

2. The bar-shaped light guide according to claim 1, wherein the plurality of the grooves formed on the pattern surface are formed with such a pitch that the grooves adjacent each other are partially overlapped at least in a longitudinal direction.

3. The bar-shaped light guide according to claim 1 further comprising, the surface opposite to the light emitting surface including a plurality of grooves regularly formed thereon.

4. The bar-shaped light guide according to claim 1, wherein a distance between the pattern surface and a surface opposite to the pattern surface is smaller than a width of the pattern surface.

5. The bar-shaped light guide according to claim 1, wherein a plurality of grooves are further formed regularly on the surface opposite to the pattern surface and an angle formed by a bottom side of the light emitting surface and the groove is 35–55° on the side of the point light source.

6. The bar-shaped light guide according to claim 5, wherein the plurality of the grooves are formed with such a pitch that the grooves adjacent each other are partially overlapped at least in a longitudinal direction.

7. A bar-shaped light guide comprising, a first light incident surface for receiving light emitted from a first point light source, a second light incident surface, which is opposite to the first light incident surface, for receiving light emitted from a second point light source, a light emitting surface, which is orthogonal to a plurality of the light incident surfaces, for emitting light received on the plurality of the light incident surfaces in a form of beam light, a surface opposite to the light emitting surface, a first pattern surface made up of upper sides of the plurality of the light incident surfaces and an upper side of the light emitting surface and including a plurality of grooves regularly formed, where an angle formed by the upper side of the light emitting surface and the groove is 35–55° on a side of the first point light source, and a second pattern surface opposite to the first pattern surface and including a plurality of grooves regularly formed, where an angle formed by a bottom side of the light emitting surface and the groove is 35–55° on a side of the second point light source.

8. The bar-shaped light guide according to claim 7, wherein the plurality of the grooves formed on the first and second pattern surfaces are formed with such a pitch that the grooves adjacent each other are partially overlapped at least in a longitudinal direction.

9. The bar-shaped light guide according to claim 7, wherein a plurality of grooves are further formed regularly on a surface opposite to the light emitting surface.

10. The bar-shaped light guide according to claim 7, wherein a distance between the first pattern surface and the second pattern surface is smaller than widths of the first and second pattern surfaces.

11. A beam lighting device comprising, a point light source, and a bar-shaped light guide including a light incident surface for receiving light emitted from the point light source, and a light emitting surface, which is orthogonal to the light incident surface, for emitting light received on the light incident surface in a form of beam light, wherein the bar-shaped light guide includes a pattern surface made up of a side of the light incident surface and a side of the light emitting surface, which are contact each other, and having a plurality of grooves regularly formed thereon, and an angle formed by the groove and the side of the light emitting surface is 35–55° on a side of the point light source.

12. A beam lighting device comprising, a first point light source, a second point light source, and a bar-shaped light guide including a first light incident surface for receiving light emitted from the first point light source, a second light incident surface for receiving light emitted from the second point light source, and a light emitting surface, which is orthogonal to the first and second light incident surfaces, for emitting light received on the first and second light incident surfaces in a form of beam light, wherein the bar-shaped light guide comprises a first pattern surface made up of upper sides of a plurality of the light incident surfaces and an upper side of the light emitting surface and including a plurality of grooves regularly formed thereon, where an angle formed by the upper side of the light emitting surface and the groove is 35–55° on a side of the first point light source, and a second pattern surface, which is opposite to the first pattern surface, including a plurality of grooves regularly formed thereon, where an angle formed by the bottom side of the light emitting surface and the groove is 35–55° on a side of the second point light source.

13. A surface lighting device comprising a surface light guide plate formed of transparent material and a beam lighting device including a point light source and a bar-shaped light guide arranged in a periphery of a side surface of the surface light guide plate, wherein the surface light guide plate includes a light incident surface for receiving light emitted from a light emitting surface of the beam lighting device, a reflecting surface, which crosses to the light incident surface at 80–100°, for reflecting light received on the light incident surface, and a light emitting surface, which is opposite to the reflecting surface, for emitting light reflected on the reflecting surface in a form of surface light, and the bar-shaped light guide comprises a light incident surface for receiving light emitted from the point light source, a light emitting surface, which is orthogonal to the light incident surface, for emitting the light received on the light incident surface in a form of beam light, and a pattern surface made up of a side of the light incident surface and a side of the light emitting surface, which are contact each other, and including a plurality of grooves formed thereon, where the plurality of the grooves are regularly arranged on the pattern surface and an angle formed by the groove and the side of the light emitting source is 35–55° on a side of the point light source.

14. A surface lighting device comprising a surface light guide plate formed of transparent material and a beam lighting device including a first point light source, a second point light source, and a bar-shaped light guide arranged in a periphery of a side surface of the surface light guide plate, wherein the surface light guide plate includes a light incident surface for receiving light emitted from a light emitting surface of the beam lighting device, a reflecting surface, which crosses to the light incident surface at 80–100°, for reflecting light received on the light incident surface, and a light emitting surface, which is opposite to the reflecting surface, for emitting light reflected on the reflecting surface in a form of surface light, further the bar-shaped light guide includes a first light incident surface for receiving light emitted from the first point light source, a second light incident surface for receiving light emitted from the second point light source, a light emitting surface, which is orthogonal to the first and second light incident surfaces, for emitting light received on the first and second light incident surfaces in a form of beam light, a first pattern surface made up of upper sides of a plurality of the light incident surfaces and an upper side of the light emitting surface and including a plurality of grooves regularly formed thereon, where an angle formed by the upper side of the light emitting surface and the groove is 35–55° on a side of the first point light source, and a second pattern surface, which is opposite to the first pattern surface, including a plurality of grooves regularly formed thereon, where an angle formed by the bottom side of the light emitting surface and the groove is 35–55° on a side of the second point light source.

* * * * *